(12) United States Patent
Wang et al.

(10) Patent No.: US 8,567,355 B2
(45) Date of Patent: Oct. 29, 2013

(54) INTEGRATED CONTROL SYSTEM AND METHOD

(75) Inventors: Paul Sai Keat Wang, Peoria Heights, IL (US); Darryl Baldwin, Lafayette, IN (US); Myoungjin Kim, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 364 days.

(21) Appl. No.: 12/976,811

(22) Filed: Dec. 22, 2010

(65) Prior Publication Data
US 2012/0160191 A1    Jun. 28, 2012

(51) Int. Cl.
| F02B 43/08 | (2006.01) |
| F02B 63/00 | (2006.01) |
| B65G 51/16 | (2006.01) |
| B65G 53/66 | (2006.01) |
| B65G 51/42 | (2006.01) |

(52) U.S. Cl.
USPC ........ 123/3; 406/11; 406/12; 406/16; 406/21; 406/29; 406/37; 123/2

(58) Field of Classification Search
None
See application file for complete search history.

(56) References Cited

U.S. PATENT DOCUMENTS

| 4,278,064 | A |   | 7/1981  | Regueiro |
| 4,455,614 | A | * | 6/1984  | Martz et al. ............ 700/288 |
| 4,497,637 | A | * | 2/1985  | Purdy et al. ............. 48/111 |
| 4,946,477 | A | * | 8/1990  | Perka et al. ............ 48/197 R |
| 5,370,097 | A | * | 12/1994 | Davis ..................... 123/526 |
| 5,899,187 | A |   | 5/1999  | Gruber et al. |
| 6,016,832 | A | * | 1/2000  | Vars et al. .............. 137/487.5 |
| 6,250,260 | B1 | * | 6/2001 | Green ...................... 123/27 GE |
| 6,647,903 | B2 |   | 11/2003 | Ellis |
| 6,915,869 | B2 | * | 7/2005 | Botti et al. ............. 180/65.245 |
| 6,947,829 | B2 | * | 9/2005 | Honda ..................... 701/111 |
| 6,978,772 | B1 | * | 12/2005 | Dorn et al. ............. 123/568.12 |
| 7,591,253 | B2 | * | 9/2009 | Martindale ............. 123/525 |
| 7,675,187 | B2 | * | 3/2010 | Woods et al. ........... 290/1 A |
| 2004/0159289 | A1 | * | 8/2004 | Taylor et al. ............. 123/3 |
| 2006/0054135 | A1 | * | 3/2006 | Shimada et al. ......... 123/406.11 |
| 2007/0209642 | A1 | * | 9/2007 | Schmidt .................. 123/527 |
| 2008/0000436 | A1 | * | 1/2008 | Goldman ................. 123/18 R |
| 2008/0110419 | A1 | * | 5/2008 | Sakurai et al. ........... 123/3 |
| 2008/0210089 | A1 | * | 9/2008 | Tsangaris et al. ........ 95/90 |
| 2009/0301407 | A1 | * | 12/2009 | Cerny et al. ............. 123/3 |
| 2009/0301410 | A1 | * | 12/2009 | Vuk ....................... 123/41.2 |
| 2010/0019496 | A1 | * | 1/2010 | Yu ......................... 290/52 |
| 2010/0154428 | A1 | * | 6/2010 | Yu ......................... 60/772 |

* cited by examiner

*Primary Examiner* — Lindsay Low
*Assistant Examiner* — Charles Brauch
(74) *Attorney, Agent, or Firm* — Leydig, Voit & Mayer

(57) ABSTRACT

An integrated control system for use with an engine connected to a generator providing electrical power to a switchgear is disclosed. The engine receives gas produced by a gasifier. The control system includes an electronic controller associated with the gasifier, engine, generator, and switchgear. A gas flow sensor monitors a gas flow from the gasifier to the engine through an engine gas control valve and provides a gas flow signal to the electronic controller. A gas oversupply sensor monitors a gas oversupply from the gasifier and provides an oversupply signal indicative of gas not provided to the engine. A power output sensor monitors a power output of the switchgear and provide a power output signal. The electronic controller changes gas production of the gasifier and the power output rating of the switchgear based on the gas flow signal, the oversupply signal, and the power output signal.

19 Claims, 4 Drawing Sheets

INTEGRATED CONTROL SYSTEM AND METHOD

STATEMENT REGARDING FEDERALLY SPONSORED RESEARCH AND DEVELOPMENT

This disclosure was made in part with Government support pursuant to Department of Energy Cooperative Agreement No. DE-FC26-01CH11079 entitled "Advanced Natural Gas Reciprocating Engine(s)" (ARES) in cooperation with the Department of Energy. The Government may have certain rights in this disclosure.

TECHNICAL FIELD

This patent disclosure relates generally to internal combustion engines and, more particularly, to engines, such as stationary engines, operating with gas produced by a biomass gasification process.

BACKGROUND

Stationary engines, such as those used to drive generators (gensets), compressors, pumps and other applications are known. In certain applications, stationary engines utilize local fuel sources, for example, natural gas at a petroleum processing installation or hydrocarbon gases at landfills, for operation. The efficient use of gaseous fuel from the local source, which might have been wasted or otherwise disposed of, promotes the economical and environmentally friendly utilization of resources.

In most stationary engine applications using a local fuel as a source of energy, the supply of the local fuel is usually different from pipeline natural gas. As a result, for purposes of system design, the supply of fuel is presumed to be infinite and excess fuel is disposed of, for example, by burning in a flare stack.

Certain local fuel sources, however, require the expense of resources to produce a gas for use as a fuel. One such application involves use of a gasifier process in which a biomass of material, for example, wood chips generated at a lumber mill, are used to generate a combustible gas. Various gasifier processes are known, so the specific characteristics and types of such processes need not be described in detail herein. One common trait shared by most gasifier processes, whether they are high or low temperature applications, requires the consumption of the biomass material to produce the gas. When a gasifier process is used in conjunction with a genset or other stationary engine application, the oversupply of fuel produced by the gasifier process, which is intended to ensure a sufficient supply of fuel to the engine under all conditions, is wasteful.

Various solutions have been proposed in the past to increase the efficiency of gasifier processes used in conjunction with stationary engine applications. One such solution can be seen in expired U.S. Pat. No. 4,278,064 (the '064 patent), which is entitled "Fuel Control System for a Dual-Fueled Power Unit." The '064 patent describes an engine coupled to a generator for electrical generation and adapted for dual fuel operation. The first fuel is diesel and the second fuel is producer gas generated in a down draft continuously operating producer of the moving-packed-bed vertical flow reactor type with co-current gas flow (see Abstract). As is described in the '064 patent, changes in electrical load of the generator cause changes to the load of the engine, which is manifested by undesired changes in engine speed during operation. The engine fueling is adjusted to compensate for engine speed changes such that the engine speed is maintained constant.

SUMMARY

The disclosure describes, in one aspect, an integrated control system for use with an engine connected to a generator. The generator provides electrical power to a switchgear. The engine operates using gas produced by a gasifier that is associated with the engine. The integrated control system includes an electronic controller operably associated with the gasifier, the engine, the generator, and the switchgear. A gas flow sensor is disposed to monitor a gas flow from the gasifier to the engine through an engine gas control valve and provide a gas flow signal indicative of the gas flow to the electronic controller. A gas oversupply sensor is disposed to monitor a gas oversupply from the gasifier and provide an oversupply signal indicative of the gas oversupply to the electronic controller. The gas oversupply is a portion of the gas flow from the gasifier that is not provided to the engine. A power output sensor is disposed to monitor a power output of the switchgear and provides a power output signal indicative of the power output to the electronic controller. The electronic controller is disposed to change a gas production of the gasifier and change a power output rating of the switchgear based on the gas flow signal, the oversupply signal, and the power output signal.

In another aspect, the disclosure describes a method for the coordinated control of a system including a gasifier connected to an engine. The engine drives a generator connected to a switchgear that provides electrical power to a grid. In the disclosed embodiment, the engine is configured to operate using a fuel being provided to the engine in gaseous phase from the gasifier. The method includes monitoring a gas flow from the gasifier to the engine through an engine gas control valve to provide a gas flow signal indicative of the gas flow. The method further includes monitoring a gas oversupply from the gasifier to provide an oversupply signal indicative of the gas oversupply, where the gas oversupply is a portion of the gas flow from the gasifier that is not provided to the engine. The method also includes monitoring a power output of the switchgear to provide a power output signal indicative of the power output. In accordance with the present disclosure, a gas production of the gasifier and a power output rating of the switchgear are changed, independently, based on the gas flow signal, the oversupply signal, and the power output signal.

DETAILED DESCRIPTION

Figure 1:
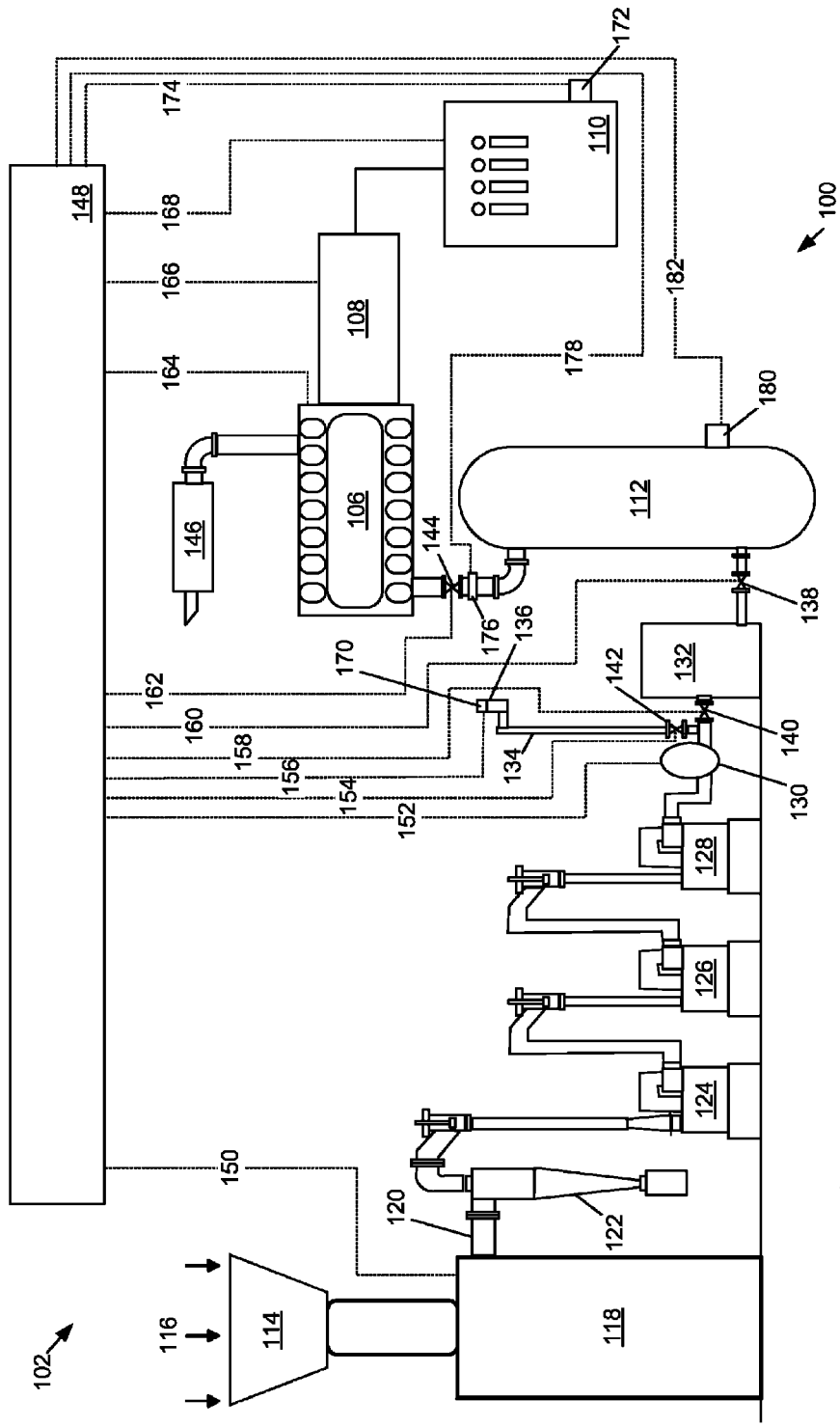
FIG. 1 is a block diagram of a genset connected to a gasifier in accordance with the disclosure.

This disclosure relates to stationary engines. In the illustrated embodiment, an engine connected to a generator for producing electrical power is shown for purpose of example, but other applications may be used.

As shown, a genset 100 is connected to a gasifier 102 to provide an integrated system 104. The genset 100 includes an engine 106 connected to and driving a generator 108. The generator 108 produces electrical power that is provided to a switchgear 110. The engine 106 operates on a fuel that is stored in an accumulator 112. The accumulator 112 is connected to the gasifier 102 and configured to receive clean and cooled gas therefrom.

The gasifier 102 can be any appropriate type of known device that provides gas to the accumulator 112. Moreover, the gasifier 102 may include more than one individual gas generators. Although certain representative components and systems are shown in the illustrated embodiment for the gasifier 102, fewer or additional components and systems may be used depending on the particular type of gasifier or biomass used. As shown, the gasifier 102 includes a hopper 114 into which the biomass 116 is loaded. The biomass 116 in the illustrated embodiment is pine wood chips, but other material can be used. The biomass 116 is provided to an enclosed firebox 118 which operates at appropriate conditions to provide a gas flow at an outlet 120. The gas at the outlet 120 is provided at a raw and heated state to downstream devices that filter, clean, meter and cool the gas before it is stored in the accumulator 112.

A cyclone separator 122 is connected to the outlet 120 and is configured to separate larger particles, such as ash or other clumped solids from the gas. Following the cyclone separator, the gas passes through a first scrubber 124, for example, an oil-based scrubber, a second scrubber 126, for example, a water-based scrubber, and a cooler 128. Flow of the gas through the system is accomplished by a blower 130, which is disposed downstream of the cooler 128. Gas at the outlet of the blower 130 may still contain fine particulates, such as fine ash particles, which are removed in a bag filter arrangement 132. The outlet of the bag filter 132 is connected to the accumulator 112.

A flare stack 134 is configured to receive excess gas from the blower 130. The flare stack 134 includes a flame initiator 136, which ignites gas provided to the flare stack 134 during operation. The flow of gas from the blower 130 into the flare stack 134 or the accumulator 112 is controlled by a three-way valve or alternatively, as shown in FIG. 1, by two single way valves. More specifically, an accumulator valve 138 and a bag filter valve 140 are placed on either side of the bag filter 132 and together operate to control the flow of gas into the accumulator 112 or to fluidly isolate the bag filter 132, for example, during service when filter elements are being replaced or cleaned. A flare control valve 142 controls the flow of gas into the flare stack 134 for disposal of excess gas from the blower 130.

Gas from the accumulator 112 is used to fuel the engine 106. Accordingly, an engine gas control valve 144 fluidly connects and controls the flow of gas from the accumulator 112 to the engine 106. When the engine 106 is operating, exhaust gas is expelled through an exhaust treatment device 146, which includes a muffler as well as other exhaust gas treatment devices such as particulate filters, catalytic converters and the like.

An electronic controller 148 is configured to coordinate and control the operation of the various components and systems of the integrated system 104. The electronic controller 148 may be a single controller or may include more than one controller disposed to control various functions and/or features of the system. For example, a master controller, used to control the overall operation and function of the machine, may be cooperatively implemented with a gasifier, switchgear and/or generator controller. In this embodiment, the term "controller" is meant to include one, two, or more controllers that may be associated with the system 104 and that may cooperate in controlling various functions and operations of the system 104. The functionality of the controller, while shown conceptually in the figures that follow to include various discrete functions for illustrative purposes only, may be implemented in hardware and/or software without regard to the discrete functionality shown. Accordingly, various interfaces of the controller are described relative to components of the system shown in the block diagram of FIG. 1. Such interfaces are not intended to limit the type and number of components that are connected, nor the number of controllers that are described.

The controller 148 is configured to control and monitor various operating functions and parameters of the gasifier 102 and of the gas treatment and filtering components it includes. Thus, a gasification process line 150 is connected to various actuators and sensors of the firebox 118. In this way, the controller 148 is able to initiate and control the generator of the raw gas. The controller 148 is also connected to the blower 130 via a blower control line 152 and configured to control its operation, for example, by initiating its operation or controlling its rate to produce a desired gas flow rate and/or pressure at the outlet of the blower 130. In the illustrated embodiment, the blower 130 is generally operated to provide gas to the accumulator at a pressure of about 5 psig (about 35 kPaG).

The flow of gas from the blower 130 is also appropriately controlled by the controller 148. In this way, the opening of the flare control valve 142 is provided by an appropriate command from the electronic controller 148 that is communicated through a flare control line 154. The flare control line 154 may further carry information indicative of the extent of opening or position of the flare control valve 142. Similarly, a signal to ignite the flare may be provided to the flame initiator 136 from the electronic controller 148 via a flame initiator line 156. The flame initiator line 156 may also provide information indicative of the presence of a flame back to the electronic controller 148. In a similar fashion, the operation and position of the bag filter valve 140 and the accumulator valve 138 may be controlled through, respectively, a bag filter valve line 158 and an accumulator valve line 160 by the electronic controller 148. Finally, an engine gas control valve line 162 may be connected to the engine gas control valve 144 to enable a fine control of the flow rate and amount of gas provided to the engine 106. As can be appreciated, the engine gas control valve 144 may operate similar to an engine throttle valve that controls the amount of fuel provided to the engine 106 and, thus, the speed and power of the engine.

Additional connections are shown between the controller 148 and the various components and systems. An engine line 164, which is shown as a single line for illustration but which includes numerous communication and control channels, interconnects the controller 148 with various sensors and actuators of the engine 106. Examples of the various engine sensors providing information to the controller 148 through the engine line 164 include timing sensors, such as crankshaft and/or camshaft sensors, temperature sensors, such as oil and/or engine coolant temperature sensors, intake air and/or exhaust gas sensors, and the like. The engine line 164 is also connected to various actuators of the engine. In other words, the controller 148 includes all those functions and operations that are required and monitor the operation of the engine 106.

The electronic controller 148 is further connected to the generator 108 via a multi-channel generator line 166. The controller 148 is configured to control the operation of the generator 108 as well as monitor various operating parameters of the generator 108 such as temperature, speed, the presence of any fault codes and the like. The electronic controller 148 is also connected to the switchgear 110 via a switchgear line 168. The switchgear line 168 is arranged for two-way communication of sensor signals and commands between the controller 148 and the switchgear 110.

Although the electronic controller 148 is connected to various other sensors of the system, such as temperature, pressure, gas flow, and other sensors that are not shown for simplicity, certain sensors are specifically shown as their function will be useful in the understanding of the disclosure that follows. More specifically, a flame sensor 170 that is associated with the flare stack 134 provides signals to the electronic controller 148 that are indicative of the presence and/or temperature of a flame at the flare stack 134. A power output meter or power output sensor 172 is connected to the electronic controller 148 via a power output line 174 and configured to provide signals thereto indicative of the power being delivered to an electric grid (not shown) by the switchgear 110. An engine gas valve position sensor 176 provides signals to the electronic controller 148 via an engine gas valve position line 178 that are indicative of the extend to which the valve is open. Finally, an accumulator pressure sensor 180 is connected to the controller 148 via a pressure sensor line 182 and configured to provide signals indicative of the accumulator gas pressure. The pressure of gas in the accumulator 112 and the opening of the engine gas control valve 144 may be used to calculate the mass and/or volumetric flow rate of gas into the engine 106 during operation.

Figure 2:
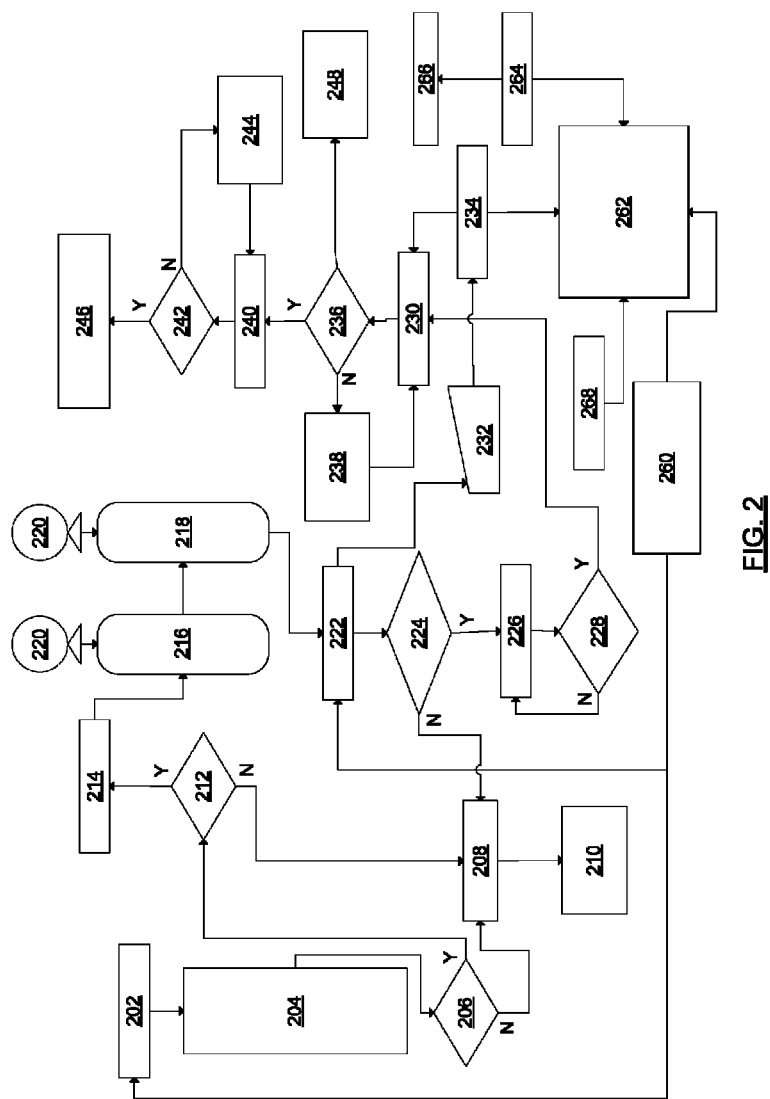
FIG. 2 is a block diagram of an integrated gasifier and engine control system for a genset connected to a gasifier in accordance with the disclosure.

A block diagram for a control algorithm operating within the electronic controller 148 that is configured to accomplish the integrated control of the gasifier 102, the engine 106, the generator 108 and the switchgear 110 such that waste of gas is minimized and its use optimized is shown in FIG. 2. In the block diagram of FIG. 2, various components and systems as well as various control processes are shown in integrated fashion for clarity. The system includes a master throttle valve 202 configured to control the amount of fresh air that is admitted into the gasifier 204 during operation. A sensor monitoring the outlet temperature of gas from the gasifier provides signals to the controller. The temperature of the outlet gas is monitored at a process operation 206. At startup or at any time during operation when the gas outlet temperature is below a threshold value, for example, 600 degrees F. (316 deg. C.), the gas is chemically inappropriate for use and is sent to the flare stack (134, as shown in FIG. 1) at process operation 208, for example, by opening an appropriate valve and by providing an ignition to ignite the gas. During this time and at any time the flare is active, a flare minimization process 210 may be used to reduce the amount of gas being diverted to the flare stack while maintaining proper operation of the gasifier.

When the temperature of the gas at the outlet of the gasifier reaches or exceeds the threshold temperature at process operation 206, an additional check is performed at process operation 212 to determine whether the temperature of oil used in the scrubbers has reached an operating temperature, for example, 225 deg. F. (107 deg. C.). While the scrubber oil temperature has not reached its operating temperature at process operation 212, the flare stack is kept active at process operation 208. When both the gas and scrubber oil have reached or exceeded their respective temperature thresholds, a heat exchanger that cools the operating gas is activated at process operation 214 and gas is supplied to an oil scrubber 216 and to a water scrubber 218, each of which may include a dedicated pump 220.

The cooled and cleaned gas is analyzed at a gas analyzer process operation 222, which is configured to determine the heating value of the gas that can be expressed, for example, in BTU/cf. units. If the gas analyzer process operation 222 indicates to a quality process operation 224 that the gas is below a minimum acceptable heating value, for example, 150 BTU/cf (1357 kcal/m$^3$), then the gas is sent to the flare stack at process operation 208 as previously described. When it is determined that the gas possesses the minimum heating value, the gas is provided to the accumulator at process operation 226. Process operation 226 may include the appropriate opening of valves and blower settings that can deliver the process gas to the accumulator.

The pressure of the gas in the accumulator is monitored at process operation 228 to ensure that a minimum pressure of gas is present within the accumulator, for example, 5 psig (about 35 kPaG). While the pressure of gas in the accumulator is below the threshold pressure value, the system continues to fill the accumulator. When the appropriate pressure in the accumulator has been attained, gas is provided to the engine 230. As an optional process operation, the gas heating value determined at the gas analyzer 222 may be manually input at a process operation 232 into an electronic control module (ECM) 234 of the engine such that engine operation can be optimized. Optimization parameters may include ignition timing and others. The ECM 234 may be an electronic device mounted on or near the engine that includes functionality arranged to monitor and control engine operation.

Figure 3:
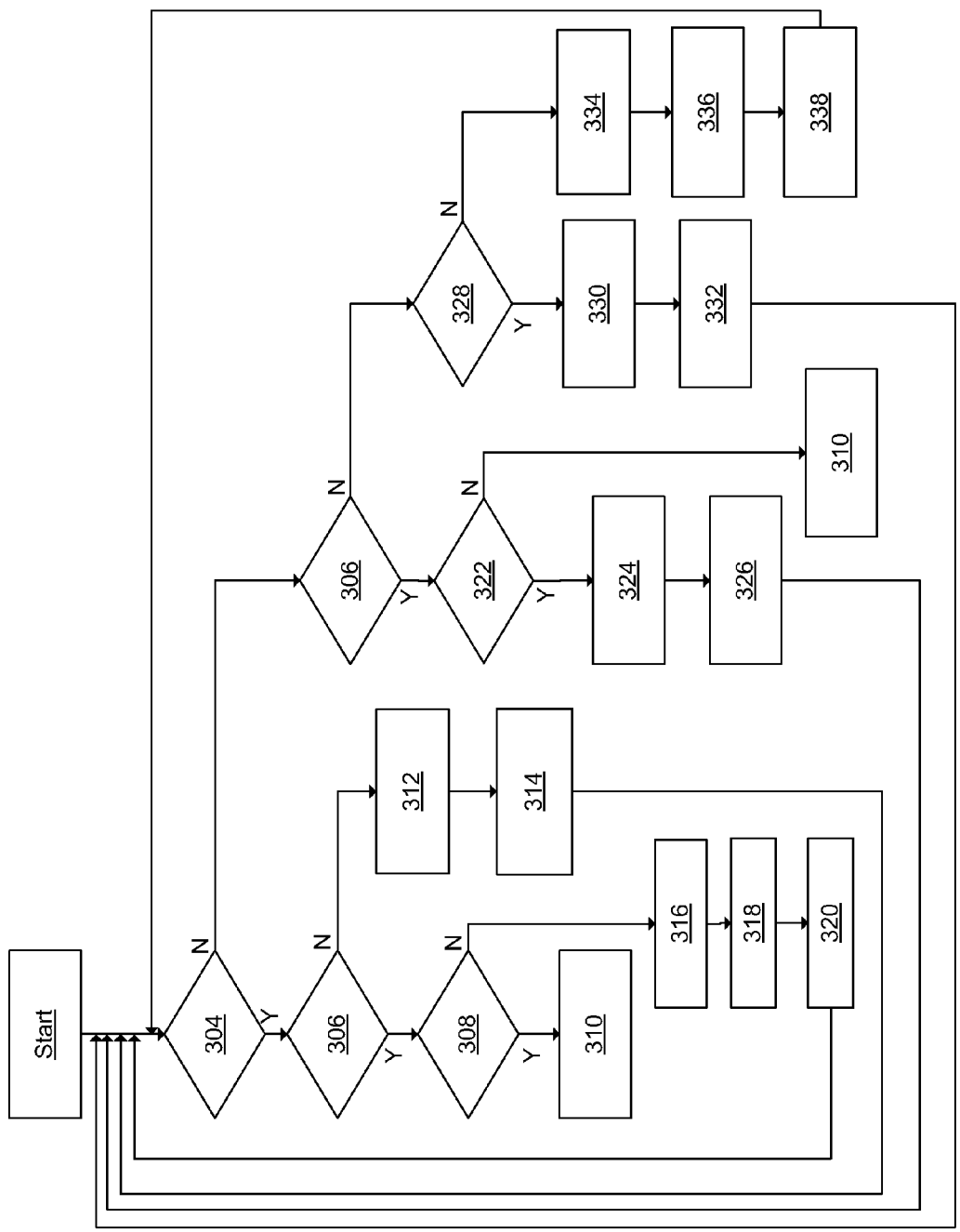
FIG. 3 is a block diagram for a gas supply optimizer in accordance with the disclosure.

While the gasifier is providing gas to the engine 230, a gas supply optimizer 302 operates to adjust the gas generated. A block diagram of the gas supply optimizer 302 is shown in FIG. 3. At the start of the process, a determination of whether excess gas is in the system is performed at process operation 304. The determination at 304 may be carried out based on monitoring of various system parameters that are indicative of the presence of excess or undesired gas being present in the system, such as whether the flare is active or whether a gas pressure relief valve is open. In parallel with the determination at 304, a determination of whether the power output of the switchgear is at a predetermined or desired level, such as 1.0 MW, is carried out at process operations 306. The determination at 306 may occur regardless of the disposal of excess gas as determined at process operation 304, which is a function illustrated by two process operation 306 blocks in the diagram of FIG. 3.

When excess gas is determined to be present in the system at 304 but the power output of the system is sufficient at 306, a determination of whether the overflow of gas is acceptable is carried out at process operation 308. When the gas overflow is determined to be acceptable, the system operates in a steady state mode, which is represented in the diagram by block 310. If the gas overflow is determined to be excessive, however, a signal or command is sent to the switchgear at process operation 316 to prepare for a potential reduction in rating without actually reducing the rating, and a signal is sent to the gasifier at process operation 318 to reduce gas production at 320. The reduction in gas production at 320 may be accomplished by any combination of appropriate actions, such as adjusting the fresh air inlet to the firebox, the rate of biomass supply and the like.

At times when the flare is determined to be active at 304 but the power is determined to be low at 306, it is taken as an indication of spare power capability of the system and a signal is sent to the switchgear at process operation 312 to increase the output rating or rerate the output power of the switchgear at process operation 314. The switchgear rerate may be accomplished by increasing the power output limit of the switchgear by a predetermined percentage amount. To promote system stability, such rerate may also include a time delay of a few minutes to allow the system sufficient time to stabilize, and the process is repeated.

The above operations are carried out when excess gas is determined to be in the system. In such conditions, the gas supply optimizer examines the power output and either reduces gas production or increases the power output of the system such that more optimal utilization of the gas can be accomplished.

When no excess gas is present, as indicated by process operation 304, the power output of the system is examined at process operation 306 as previously described. When the power is determined to be of a sufficient level, the rate of gas supply to the engine is examined at process operation 322. In one embodiment, the position of the engine gas supply valve can be used as an indication of the gas supply to the engine assuming that the reservoir is at a known or measured pressure. If the position of the engine gas supply valve is above a threshold opening, for example, 95% or more, this is taken as an indication of potential valve opening saturation and a signal is sent to the switchgear at process operation 324 to derate the power output by a predetermined amount at 326. Once again, to promote system stability, the derate at 326 may include a time delay of a few minutes to allow the system sufficient time to stabilize before the process is repeated. If the valve position at 322, however, is determined to be below the threshold, then the system is presumed to be operating at a steady state, which is also illustrated in the diagram by block 310.

When no excess gas is present, as indicated by process operation 304, and the power output is below a desired value, as indicated by process operation 306, the rate of gas input to the engine is examined at process operation 328. Similar to the determination at 322, the rate of supply of gas to the engine may be accomplished by monitoring the position or opening extent of the engine gas supply valve, for example, valve 144 as shown in FIG. 1. If the engine gas supply valve is determined to be close to fully open, for example, more than 95% open, a signal is sent to the switchgear at process operation 330 to derate the power output by a predetermined amount and wait for a predetermined time to allow the system to react at process operation 332. When, however, under these conditions the gas supply to the engine is below a saturation threshold, this is taken as an indication of additional power capability of the system and a signal is sent to the switchgear at process operation to interrogate the switchgear whether additional power is required. If additional power can be used, the switchgear is instructed prepare for an increase in power, and a signal is sent to the gasifier at process operation 336 to increase the gas production at 338.

In other words, when no excess gas is present in the system and sufficient power is provided to the switchgear, the switchgear is derated if the gas supply valve to the engine is close to a saturation point and/or the gas supply is increased if additional power can be used by the switchgear.

Returning now to the block diagram of FIG. 2, one aspect of engine operation that may be affected by changes in the quality of the gas synthesized at the gasifier (syngas), such as the heating value or methane number of the syngas, is the timing of combustion. In this way, if changes to the timing are not compensated for, knocking or other combustion effects may result, which can reduce the service life of engine components and lead to rough engine operation. Accordingly, in the illustrated embodiment, the ECM 234 includes functionality that automatically or manually compensates engine ignition timing operation based on the heating value of the gas determined at the gas analyzer 222.

A determination of whether the engine is knocking is carried out at process operation 236. The determination at 236 may be accomplished by any appropriate method, such as by use of knock sensors that provide information to the ECM 234 indicative of a knock condition or by any other appropriate method, such as monitoring a camshaft or crankshaft signal for irregularities. When no engine knocking is detected, the engine timing remains unchanged at process operation 238, and the monitoring process repeats. When knocking is detected at 236, the ignition timing of the engine is retarded at process operation 240. The ignition timing retard at 240 may be determined dynamically based on the severity of the knocking, or may alternatively be changed by a predetermined extent, for example, six degrees. After the retard has been implemented at 240, a determination of whether the knocking persists is carried out at process operation 242. If the knocking has ceased, the timing is advanced at process operation 244 at a predetermined rate, for example, by one degree per minute, while a monitoring of reappearance of the knocking is carried out, for example, at process operation 236. If, however, the retard is unsuccessful at remedying the knocking at the determination at 242, a shutdown process of the engine is initiated and the flow of syngas to the engine is stopped by commanding the engine gas valve 144 (FIG. 1) to close at process operation 246.

The ECM 234 or, in general, the controller 148 (FIG. 1) also includes a detonation derate strategy 248 that is implemented to address gas quality variations. The detonation derate strategy 248 is associated or cooperates with the engine's knocking detection to ensure that appropriate commands are sent to the switchgear (for example, the switchgear 110 as shown in FIG. 1). In this way, the load provided to an electric grid is adjusted to be consistent with the power output capability of the system. A block diagram of one embodiment for the detonation derate strategy 248 is shown in FIG. 4.

Figure 4:
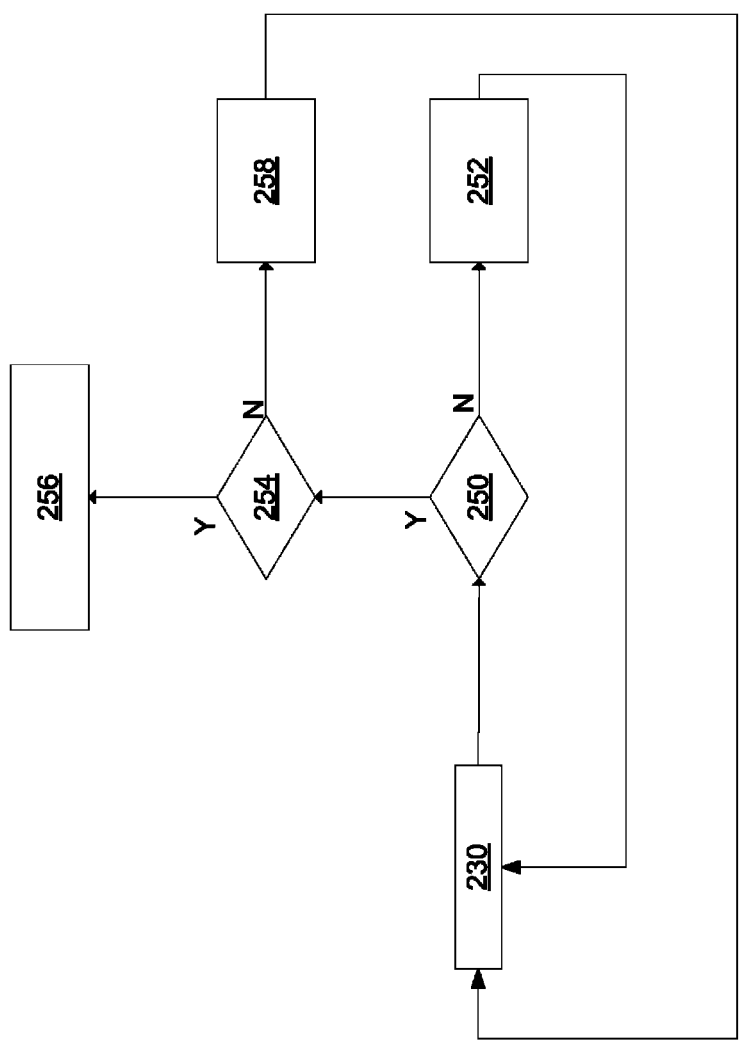
FIG. 4 is a block diagram for a detonation derate strategy in accordance with the disclosure.

In reference to FIG. 4, the detonation derate strategy 248 monitors operation of the engine 230 at a process operation 250 that is arranged to monitor historical data indicative of derates that were required by the gas supply optimizer 302 (FIG. 3). The monitoring at 250 may check for a rate at which switchgear derates were conducted, for example, by calculating derates per minute, and compare the calculated derate frequency to a threshold derate frequency value. While the derate frequency is below the threshold, a re-rate signal otherwise generated at process operation 314 (FIG. 3) as previously described is permitted to be provided to the switchgear at process operation 252.

In the event the derate frequency is above a threshold, this is taken as an indication of potential system instability. In this condition, a determination of whether a maximum derate condition is present is carried out at process operation 254. If the derate is determined to be at or beyond a threshold allowable derate, a shutdown request is sent to the switchgear and the gas supply to the engine is stopped at process operation 256. While the derate of the system has not reached the threshold allowable derate, the derate commands generated by the gas supply optimizer 302 (FIG. 3) are provided to the switchgear as previously described at 258. In other words, the detonation derate 248 operates as a watchdog algorithm to ensure that the system operates within expected parameters.

Turning back to the diagram of FIG. 2, additional components are shown that effect the various functions and control operations of the system in the illustrated embodiment. For example, a gasifier programmable logic controller (PLC) 260 is connected to the master throttle valve 202 to control the air intake to the gasifier as well as being connected to a switchgear controller 262 so that it can receive gas production increase and decrease indications therefrom as previously discussed. The switchgear controller 262 is interconnected and configured to exchange information and commands with the gasifier PLC 260, the engine ECM 234, a load signal meter or sensor 264, which is disposed between the switchgear 262 and a utility system or electrical grid 266 and measures the power output of the switchgear. The switchgear 262 is also connected to a generator 268 that is operated by the engine 230 and provides electrical power to the switchgear 262. Of course, other interconnection arrangements having fewer or more channels for the exchange of communications, commands and signals between the various components of the system may be used.

INDUSTRIAL APPLICABILITY

The present disclosure is applicable to stationary engines. In the disclosed embodiment, a stationary engine is used to operate a generator providing power to a switchgear connected to a grid. The engine uses a gaseous fuel source that is produced in situ by a gasifier arrangement operating to convert a biomass to a combustible gas.

By use of the disclosed system and method, the operation of the gasifier and the power output of the engine can be controlled in conjunction with the power rating of the switchgear such that the waste of gas produced can be minimized. While other similar engine applications operate under design parameters that presume the gas supply to be infinite, the system and method of the present disclosure are advantageously configured to monitor the oversupply of gas, the power output of the switchgear, and the saturation of the gas supply to the engine such that optimal control can be achieved. In one embodiment, gas production is reduced when an excessive over supply is present while power output is sufficient, and gas production is increased when required. The disclosed system and method is further configured, unlike the previously proposed systems, to derate the power output when no oversupply of gas is present and the gas supply to the engine is close to saturated regardless of whether the power output is at the desired level. Similarly, the system rerates the power output when the oversupply is restored. In this way, the system operates in a stable fashion and avoids waste by limiting gas oversupply and only increasing gas supply when no oversupply is present, the power output is below a desired level, and the gas supply to the engine has is not close to being saturated.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An integrated control system for use with an engine connected to a generator, the generator providing electrical power to a switchgear, the engine operating using a gas produced by a gasifier that is associated with the engine as a fuel source, the integrated control system comprising:
    an electronic controller operably associated with the gasifier, the engine, the generator, and the switchgear, wherein the electronic controller includes a gasifier programmable logic controller, an engine electronic control module, and a switchgear controller that are adapted to exchange information with one another in a coordinated fashion;
    a gas flow sensor disposed to monitor a gas flow from the gasifier to the engine through an engine gas control valve and provide a gas flow signal indicative of the gas flow to the electronic controller;
    a gas oversupply sensor disposed to monitor a gas oversupply from the gasifier and provide an oversupply signal indicative of the gas oversupply to the electronic controller, wherein the gas oversupply is a portion of the gas flow from the gasifier that is not provided to the engine;
    a power output sensor disposed to monitor a power output of the switchgear and provide a power output signal indicative of the power output to the electronic controller;
    wherein the electronic controller is disposed to change a gas production of the gasifier and change a power output rating of the switchgear based on the gas flow signal, the oversupply signal, and the power output signal.

2. The integrated control system of claim 1, wherein the gas flow sensor includes a position sensor providing a position signal to the electronic controller indicative of an extent of opening of an engine gas supply valve supplying gas from the gasifier to the engine, and a pressure sensor disposed to monitor a pressure of gas accumulated in an accumulator disposed to receive gas from the gasifier and provide gas to the engine via the engine gas control valve, the pressure sensor being disposed to provide a pressure signal indicative of the pressure of gas to the electronic controller, and wherein the gas flow signal is calculated by the electronic controller based on the position signal and the pressure signal.

3. The integrated control system of claim 1, wherein the gas oversupply sensor includes at least one of a flame sensor and a pressure relief valve activation sensor.

4. The integrated control system of claim 1, wherein the electronic controller is further disposed to cause a reduction in gas production at the gasifier when the oversupply signal indicates that an oversupply of gas is present and is above a threshold value and when the power output signal is below a corresponding threshold value.

5. The integrated control system of claim 1, wherein the electronic controller is further disposed to increase an output rating of the switchgear when the oversupply signal indicates that an oversupply of gas is present and the power output signal is below a corresponding threshold value.

6. The integrated control system of claim 1, wherein the electronic controller is further disposed to decrease an output rating of the switchgear for a predetermined period when the oversupply signal indicates that there is no oversupply of gas, the power output signal indicates that that power output is at a desired level, and the gas flow signal is below a threshold value.

7. The integrated control system of claim 1, wherein the electronic controller is further disposed to decrease an output rating of the switchgear when the oversupply signal indicates that there is no oversupply of gas, the power output signal is below a threshold value, and the gas flow signal is above a threshold value.

8. The integrated control system of claim 1, wherein the electronic controller is further disposed to cause an increase in gas production at the gasifier when the oversupply signal indicates that there is no oversupply of gas, the power output signal is below a threshold value, and the gas flow signal is below a threshold value.

9. The integrated control system of claim 1, wherein the electronic controller further comprises a watchdog function configured to allow the changes to the output rating of the switchgear while a maximum derate condition has not been reached.

10. The integrated control system of claim 1, wherein the electronic controller is further disposed to monitor for an engine knocking condition and retard engine ignition timing when the engine knocking condition is detected.

11. The integrated control system of claim 10, further including a knock sensor configured to provide an engine knock signal to the electronic controller, the engine knock signal being indicative of a presence of an engine knocking condition, wherein the electronic controller is further disposed to analyze the engine knock signal and detect the engine knocking condition.

12. The integrated control system of claim 11, wherein the electronic controller is further disposed to retard engine timing by a predetermined amount when the engine knocking condition is present, and to re-advance engine timing while the engine knocking condition does not persist.

13. A method for the coordinated control of a system including a gasifier connected to an engine, the engine driving a generator connected to a switchgear that provides electrical power to a grid, the engine being configured to operate using a fuel provided to the engine in gaseous phase from the gasifier, the method comprising:
  monitoring a gas flow from the gasifier to the engine through an engine gas control valve to provide a gas flow signal indicative of the gas flow;
  monitoring a gas oversupply from the gasifier to provide an oversupply signal indicative of the gas oversupply, wherein the gas oversupply is a portion of the gas flow from the gasifier that is not provided to the engine;
  monitoring a power output of the switchgear to provide a power output signal indicative of the power output;
  changing, independently, a gas production of the gasifier and a power output rating of the switchgear based on the gas flow signal, the oversupply signal, and the power output signal.

14. The method of claim 13, further comprising reducing gas production at the gasifier when the engine operates at a steady state, the oversupply signal indicates that an oversupply of gas is present and is above a threshold value, and when the power output signal is below a corresponding threshold value.

15. The method of claim 13, further comprising increasing an output rating of the switchgear when the oversupply signal indicates that an oversupply of gas is present and the power output signal is below a corresponding threshold value.

16. The method of claim 13, further comprising decreasing an output rating of the switchgear for a predetermined period when the oversupply signal indicates that there is no oversupply of gas, the power output signal indicates that that power output is at a desired level, and the gas flow signal is below a threshold value.

17. The method of claim 13, further comprising decreasing an output rating of the switchgear when the oversupply signal indicates that there is no oversupply of gas, the power output signal is below a threshold value, and the gas flow signal is above a threshold value.

18. The method of claim 13, further comprising increasing gas production at the gasifier when the oversupply signal indicates that there is no oversupply of gas, the power output signal is below a threshold value, and the gas flow signal is below a threshold value.

19. The method of claim 13, further comprising allowing changes to the output rating of the switchgear while a maximum derate condition has not been reached.

* * * * *